May 12, 1936.  F. L. FOSTER  2,040,172
DIE AND METHOD OF PRODUCING THE SAME
Filed Aug. 8, 1932
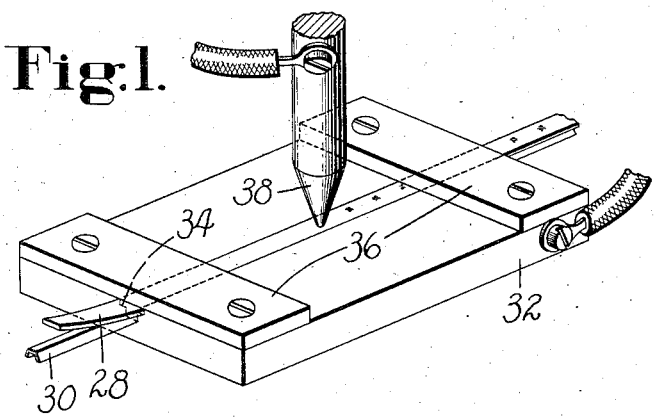
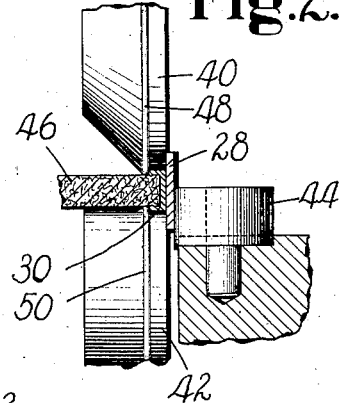
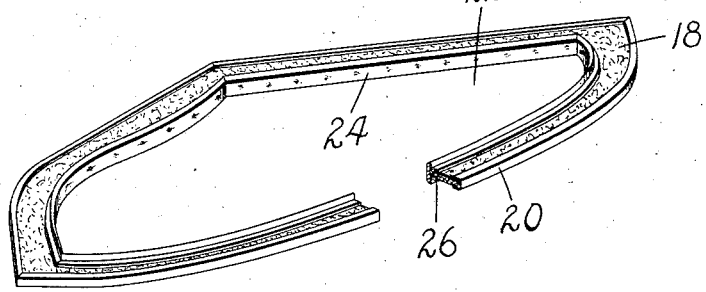
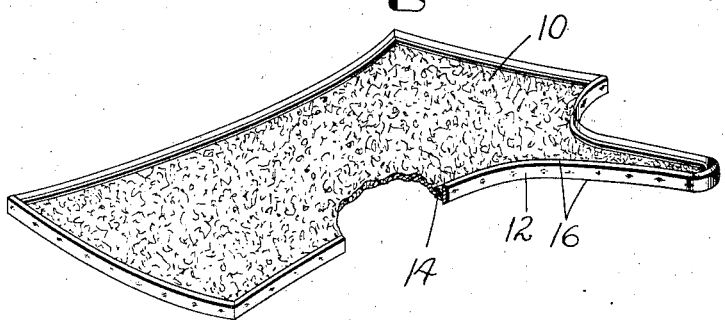
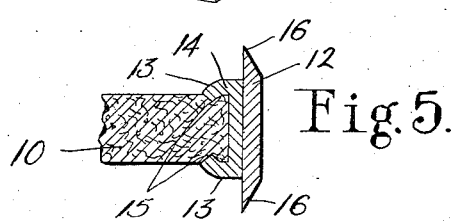
INVENTOR
Fred L. Foster
By his Attorney
Harlow M. Davis Patented May 12, 1936

2,040,172

UNITED STATES PATENT OFFICE 2,040,172

DIE AND METHOD OF PRODUCING
THE SAME

Fred L. Foster, Lynn, Mass., assignor to United Shoe Machinery Corporation, Paterson, N. J., a corporation of New Jersey Application August 8, 1932, Serial No. 627,897

11 Claims. (Cl. 76—107)

This invention relates to dies and methods for producing the same and is herein illustrated as embodied in a die for cutting sheet material, such as leather, to form shoe-part blanks.

An important part of the manufacture of shoes, is the production of the various blanks, such as vamps or quarters, which are later assembled to form the uppers of the shoes. To a very large extent, the blanks are died out from sheet material such as leather by means of hollow cutting dies in a press, known as a clicking machine. Because of the large number of different styles and sizes of shoes which manufacturers are called upon to produce, it is ordinarily necessary, often at considerable expense, to maintain at hand a correspondingly large number of such dies. In view of frequent style changes in certain lines of shoes or in other cases where a given run of shoes may be small, some manufacturers prefer to cut their shoe part blanks by a hand method wherein the operator forms the blanks by running a knife around a pattern placed upon the material. This avoids the initially greater expense of having dies made for the machine cutting operation but results in less uniform blanks and in slower production.

In view of the foregoing it is an object of the present invention to provide a die, for the cutting of shoe-parts, of such construction that it will adequately perform the cutting operations required but, at the same time, will be comparatively inexpensive to produce.

To this end, and in accordance with the invention, the illustrated die comprises a core preferably formed of sheet material and having edge portions shaped to conform to the outline of the shoe-part blank to be produced and a comparatively thin cutting blade secured to the edge portions of the core. As illustrated, the cutting blade is secured to the core by means of projections which engage both sides of the core along said edge portions. Dies constructed as above set forth, because of their lightness are easily handled, and are inexpensive to manufacture but at the same time are accurate and sufficiently rugged to withstand use over a considerable period of time either as cores or dies.

In another aspect the invention contemplates a die comprising a core having inwardly disposed edge portions to which is secured a cutting blade, the construction being such that the material to be operated upon can readily be inspected when the die is placed upon the material.

Still another aspect of the invention resides in a novel method of making cutting dies which comprises providing a pattern or core having edge portions substantially corresponding to those of a shoe-part blank, bending a cutting blade into engagement with the core along said edge portions, and securing the blade to the pattern.

Other features of the invention will be apparent from the following detailed description when taken in connection with the accompanying drawing and will be pointed out in the claims.

In the drawing,

Fig. 1 illustrates apparatus for spot-welding the cutting blade to a binding strip;

Fig. 2 is a view partly in section illustrating apparatus for securing the assembled cutting blade and binding strip to the core of a die;

Figs. 3 and 4 are perspective views of two different forms of dies constructed in accordance with my invention; and Fig. 5 is a view showing an enlarged cross section through the edge portion of the die of Fig. 4.

As shown in Fig. 4 of the drawings one form of die constructed in accordance with my invention comprises a core 10 in the form of a pattern the periphery of which has been graded accurately to correspond substantially to the outline of a shoe-part such as a quarter. For convenience the core 10 can expeditiously be made of light material, such as fibreboard. Along the periphery of the core there is bent a cutting blade 12 preferably formed of thin, flexible steel of such width and so arranged that it projects somewhat above and below, respectively, opposite faces of the core and perpendicular thereto. As shown in Figs. 4 and 5, the cutting blade 12 is secured to the core by means of a U-shaped binding strip 14 which is permanently secured to the blade preferably by welding so that the strip constitutes an integral part of the blade. The legs 13 of the U-shaped strip form projections which are pressed into engagement with the opposite faces of the core. Preferably, the ends 15 of the legs of the binding strip 14 are bent inwardly to penetrate the core thus firmly to hold the cutting blade in position. Both edges 16 of the cutting blade are ground thus to form a double-edged cutting die, that is, one which can be used with either its upper or its lower cutting edges in engagement with the work for cutting left and right blanks respectively. Since the cutting blade is perpendicular to the faces of the pattern or core and closely adjacent thereto, the cutting edges 16 will correspond closely to the outline of the pattern which in turn closely corresponds to the outline of the blank which it is desired to cut. In view of this, the die can be used as a pattern for the cutting of shoe parts by hand if such is desired.

An alternative form of construction is illustrated in Fig. 3, in which there is shown a die having a core 18 and an outer U-shaped binding strip 20. The interior of the core is cut away as indicated by reference character 22 to form inwardly disposed edge portions substantially in the shape of the outline of a blank to be produced. In this instance a cutting blade 24 is secured to such inwardly disposed edge portions by means of a U-shaped binding strip 26 in the same fashion as the cutting blade 12 is secured to the core 10. By forming the die in the manner above indicated the cutting blade 24 can be used to indicate the area to be cut from the work when the die is placed thereon, this being because of the fact that there are no obstructions within the cutting blade. Thus, it will be possible for an operator to see all of the material which will go into the cut blank, with the result that he can so place the die as to avoid imperfections which might otherwise extend into the blank.

In producing dies of either of the types above described a pattern or core is first formed, preferably from metal or fibre board. The edge portions of such patterns are made accurately to correspond to the desired outline of the shoe part blank to be produced. Preferably, this is done by means of a pattern grading machine, for example, of the type illustrated in United States Letters Patent No. 978,486, granted December 13, 1910, upon application filed in the name of Charles E. Reed. A cutting blade is then secured to the pattern along edge portions thereof to produce the completed die. In making dies such as those illustrated in Figs. 3 and 4 a strip of comparatively thin steel, such as strip 28, subsequently to form a cutting blade, is spot-welded to a U-shaped binding strip, such as strip 30, one type of apparatus for doing this being illustrated in Fig. 1. As shown, this apparatus comprises a plate 32 having therein a T-shaped slot 34 adapted for the reception of the strips 28, 30 in superposed relation, there being two clamping plates 36 for maintaining the strips in contact. The strips 28 and 30 are advanced along the groove 34 and are repeatedly subjected to the action of a spot-welding tool 38 to secure them together thus to form a unitary member.

In attaching the cutting blade to the core of the die use is made of apparatus such as, for example, that shown in Fig. 2, wherein is disclosed two crimping rolls 40 and 42 and a backing roll 44. In operating the rolls a core section, such as core section 46, is pressed within the legs of the binding strip 30 and forced against the backing roll 44 and then advanced longitudinally between the crimping rolls 40 and 42 with the result that the legs of the strip 30 are pressed into engagement with opposite faces of the core section. The rolls 40 and 42 have flanged portions 48 and 50 which serve to force the ends of the legs of the strip slightly into the core, thus securing the blade 28 to the core along the periphery of the latter. The rolls 40 and 42 are preferably small in diameter so that they will be operative to crimp the strip 30 close to the corners of the core. In rounding the corners of the core it is desirable to cut V-shaped notches in the strip 30 in order closely to conform the strip to the core. After the blade is secured to the core it is sharpened, which can readily be done by an emery wheel or by a file in the usual manner, the cutting edge being formed along the inside wall of the blade to cause the edge more closely to conform to the outline of the pattern.

Having described the invention, what I claim as new and desire to secure by Letters Patent of the United States is:

1. A die comprising a plate, a cutting blade extending along the edge portion of the plate, and members projecting from the blade and spaced apart to provide an open mouth to receive the edge portion of the plate, said members engaging opposite faces of the plate for securing the blade to the plate.

2. A die comprising a plate, a double-edged cutting blade extending along edge portions of the plate, and spaced flanges integral with the cutting blade and permanently secured to the plate.

3. A die comprising a plate, and a cutting blade extending substantially at right angles to a face of the plate along the edges thereof, said blade having spaced flanges projecting therefrom along substantially the entire periphery of the plate, said flanges engaging and being secured to oppositely disposed faces of the plate.

4. A die comprising a plate, a blade extending along edge portions of the plate, means for securing the blade to the plate comprising an intermediate member positioned between the edge portions of the plate and the blade and rigidly secured to the blade, and projections extending from said member into engagement with opposite faces of the plate for securing the member to the plate.

5. A die for producing shoe part blanks comprising a core member and a cutting member extending substantially normal to each other, each of said members being formed of sheet material, and means for securing the members together comprising projections integral with the cutting member extending into engagement with opposite faces of the core member and secured thereto.

6. A double edged cutting die comprising a flat core having edge portions corresponding closely to the outline of a blank to be cut, a cutting blade having portions projecting perpendicularly of the faces of the core on opposite sides thereof and terminating in oppositely disposed cutting edges, and means for securing the cutting blade to the core comprising two flanges projecting from the cutting blade and forming an open-mouthed channel receiving the edge portions of the core, said flanges engaging oppositely disposed faces of the core.

7. A die comprising a blade having oppositely disposed cutting edges, flanges integral and coextensive with the blade and spaced apart heightwise of the blade between the cutting edges, and a blade supporting plate having edge portions positioned between the flanges and secured thereto.

8. A cutting die comprising a core having edge portions corresponding substantially to the outline of a shoe-part blank, a U-shaped strip of metal extending along said edge portions with the leg portions of the strip embracing said edge portions, and a cutting blade secured to the strip.

9. A cutting die comprising a core having the central portion thereof cut away to form inner edge portions corresponding to the outline of a shoe-part blank, a binding strip secured to said edge portions, and a cutting blade secured to the binding strip.

10. The method of producing a cutting die which consists in cutting from sheet material a plate conforming closely to the outline of a blank to be cut, and bending a cutting blade along the edge portions of the plate, while simultaneously securing the blade permanently to the plate.

11. The method of producing cutting dies which consists in cutting from sheet material a plate corresponding in size and shape substantially to a shoe-part blank, securing a cutting blade to a binding strip, bending the blade and strip along the edge portions of the plate, and securing the binding strip to the plate progressively as the blade and strip are bent into conformity with the edge portion of the plate.

FRED L. FOSTER.

CERTIFICATE OF CORRECTION.

Patent No. 2,040,172.

May 12, 1936.

FRED L. FOSTER

It is hereby certified that error appears in the printed specification of the above numbered patent requiring correction as follows: Page 1, first column, line 47, for the word "cores" read patterns; and that the said Letters Patent should be read with this correction therein that the same may conform to the record of the case in the Patent Office.

Signed and sealed this 15th day of September, A. D. 1936.

Henry Van Arsdale

Acting Commissioner of Patents.

(Seal)